F. C. RINSCHE.
CALCULATING MACHINE.
APPLICATION FILED APR. 10, 1907.
1,050,041.
Patented Jan. 7, 1913.
5 SHEETS—SHEET 5.
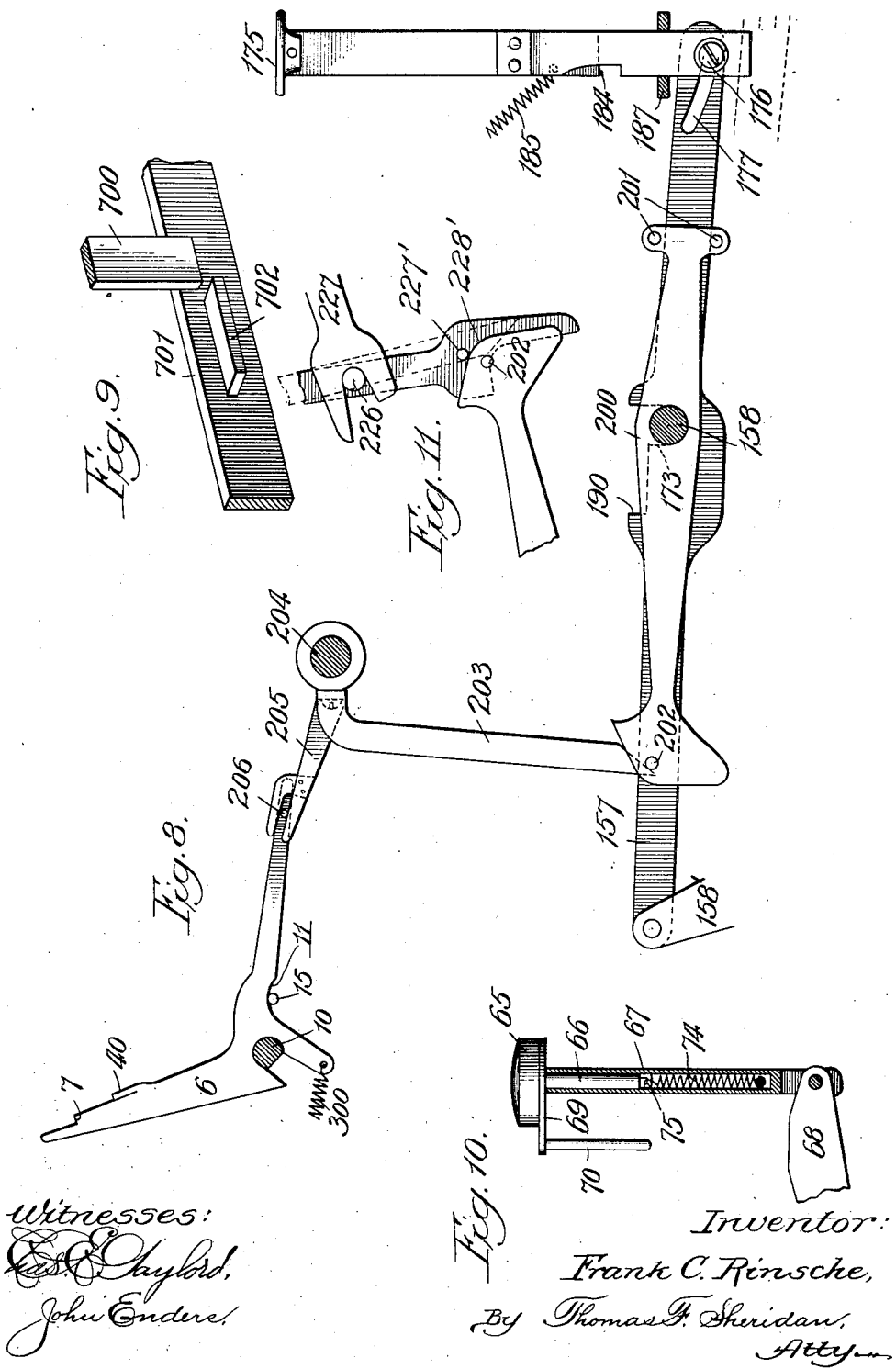

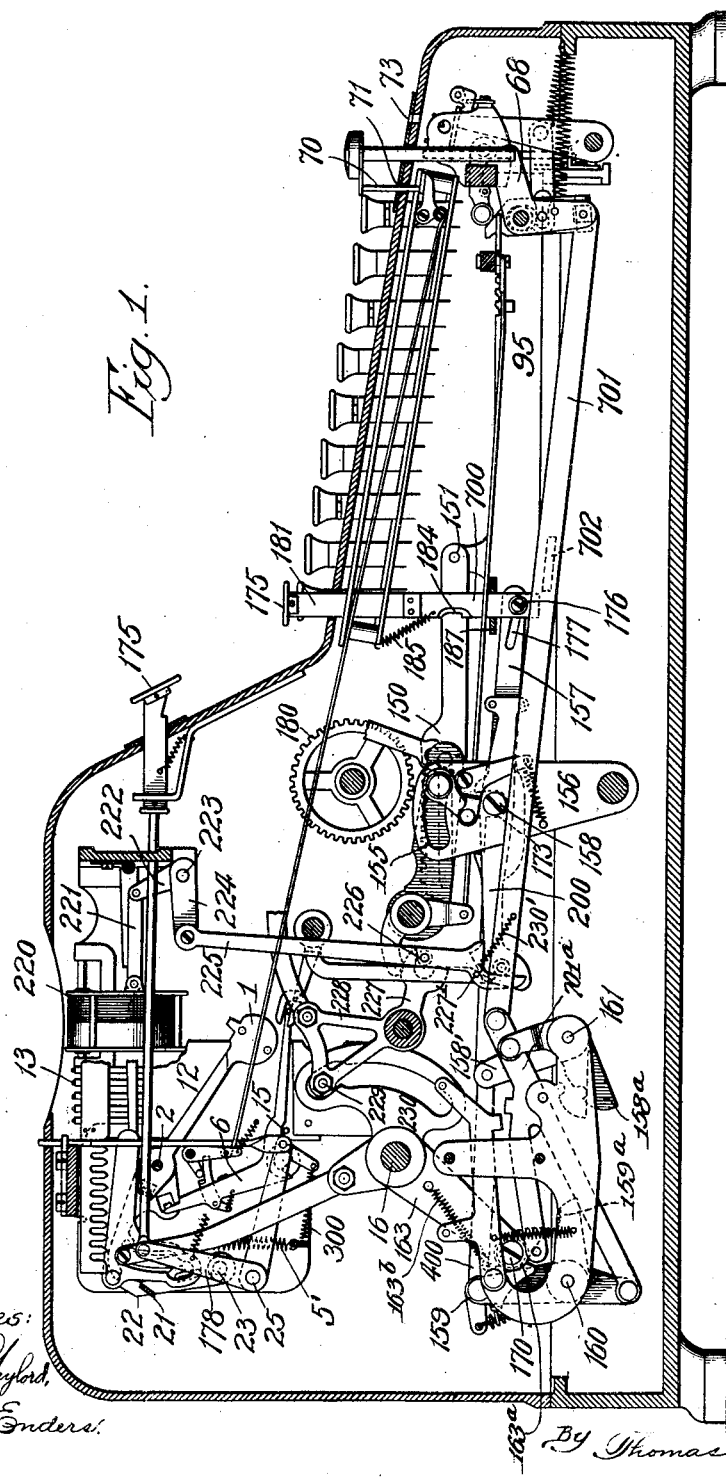

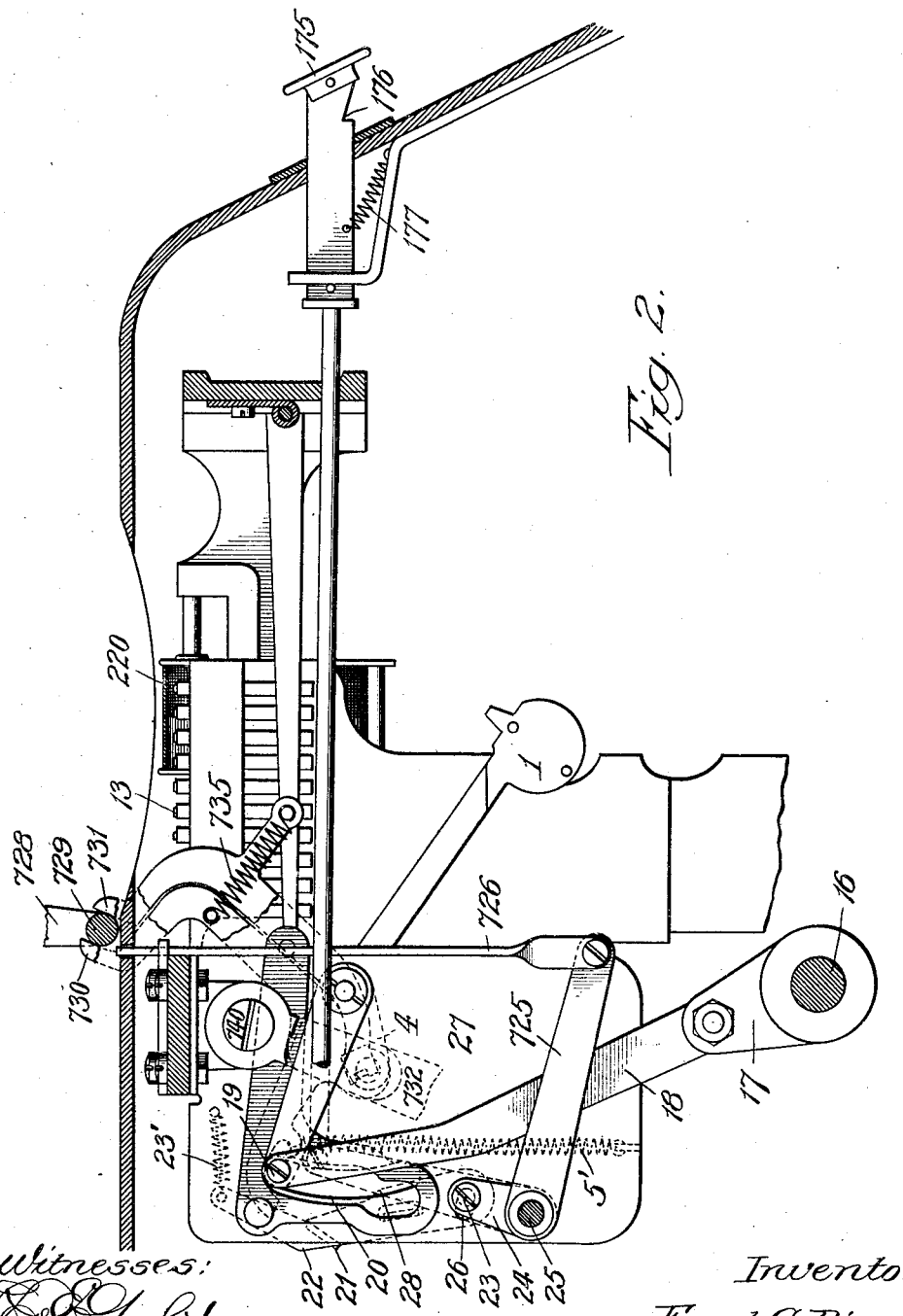

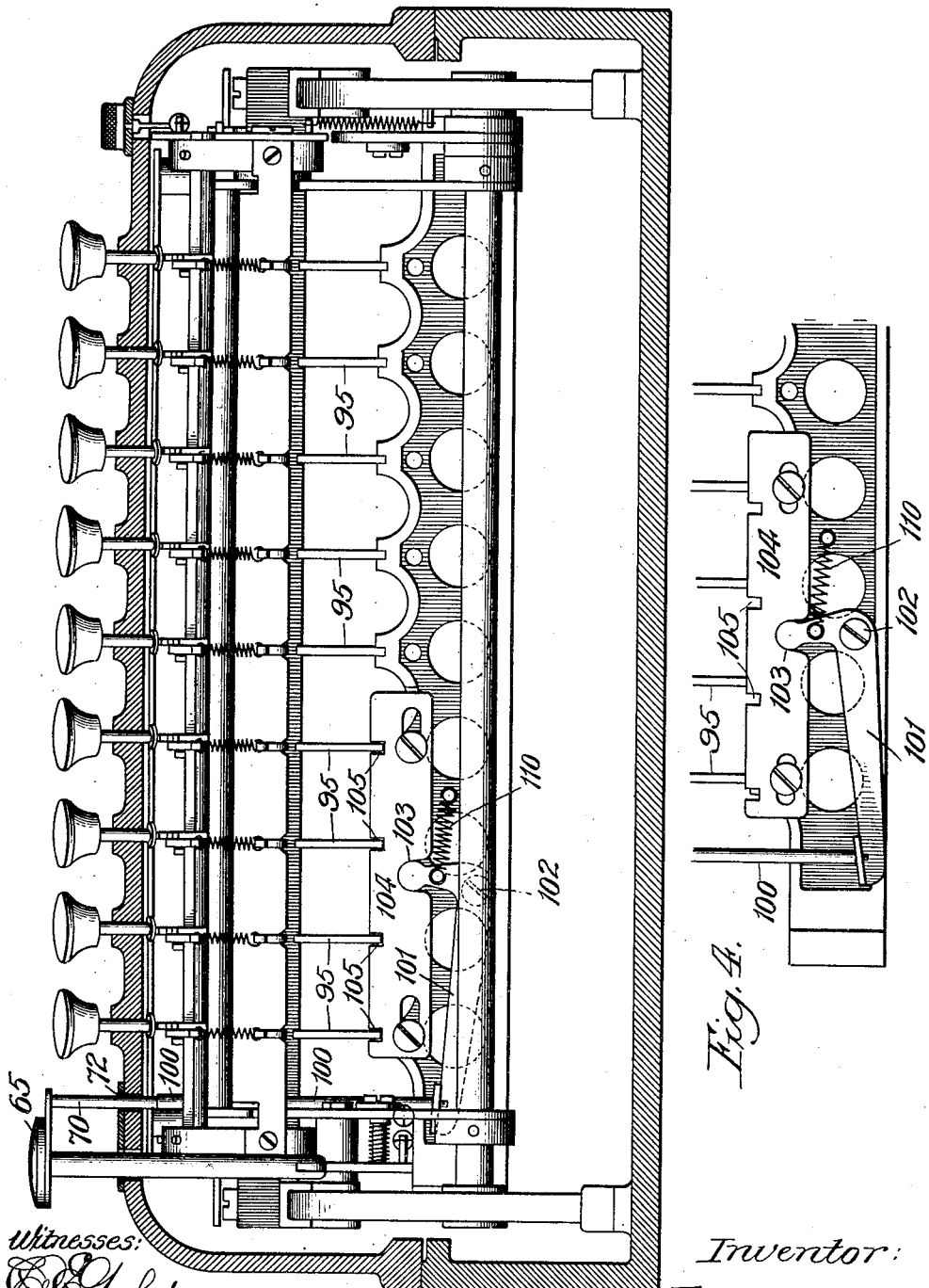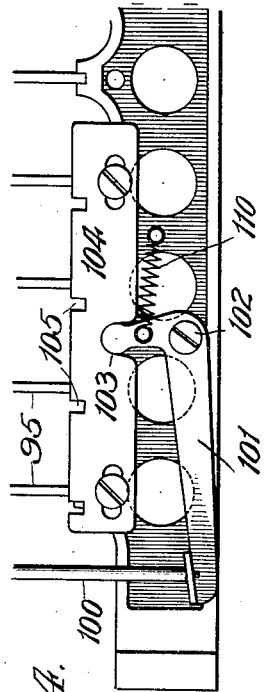

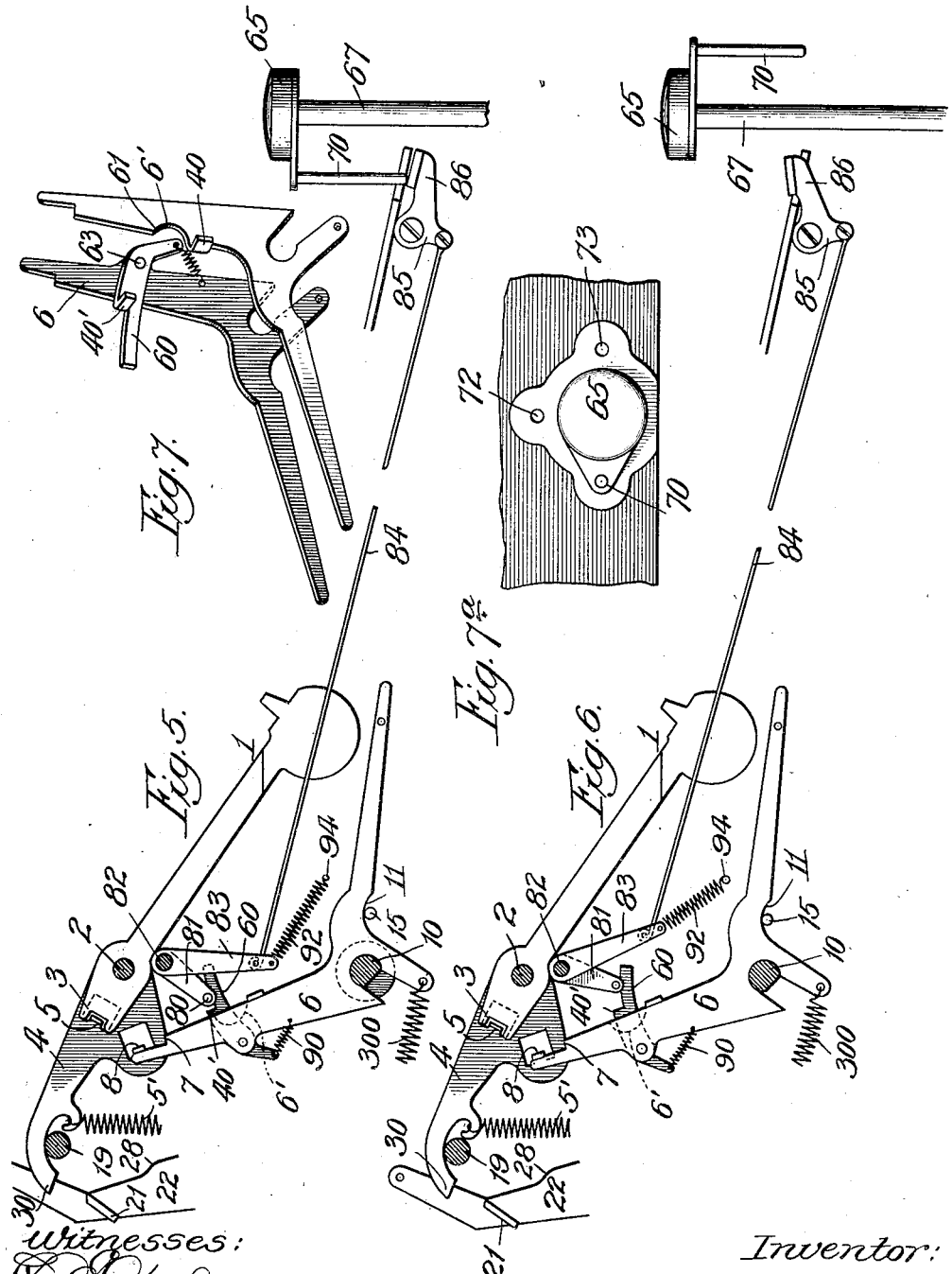

UNITED STATES PATENT OFFICE.

FRANK C. RINSCHE, OF ST. LOUIS, MISSOURI.

CALCULATING-MACHINE.

1,050,041. Specification of Letters Patent. Patented Jan. 7, 1913.

Application filed April 10, 1907. Serial No. 367,420.

*To all whom it may concern:*

Be it known that I, FRANK C. RINSCHE, a citizen of the United States, residing at St. Louis, State of Missouri, have invented certain new and useful Improvements in Calculating-Machines, of which the following is a specification.

As is well-known, in familiar types of adding machines (see for example my prior Patents Nos. 654,181, issued July 24, 1900, 726,803, issued April 28, 1903, and 751,207, issued February 2, 1904), the keyboard consists of a plurality of rows of keys, each row including keys for each digit from 1 to 9, and said rows representing the digits in the different orders—units, tens, hundreds, thousands, etc., according to the capacity of the machine. Usually the two right-hand rows of keys represent cents. Each row of keys is connected with suitable mechanism whereby upon the depression of the keys representing any number and the subsequent actuation of the machine that number will be printed upon a sheet of paper. Means are also provided in such machines whereby after a plurality of numbers have been printed the total of such numbers may also be printed upon a sheet of paper.

One object of my invention is to divide the adding machine into two parts, whereby a certain number of the rows of keys and connected mechanism may be used for the purpose of printing and adding items and printing the total thereof in the usual way, and the remainder of the rows of keys may be used for the purpose of printing numbers without printing the total thereof. The purpose of this improvement is to enable the operator to utilize the left-hand side of the keyboard, for the purpose of printing page numbers or dates corresponding to the numerical amounts printed on the same line of the sheet of paper by means of the keys at the right-hand side of the keyboard. My invention is of such a character that it may be applied to the adding machine in such manner that any number of the rows of keys at the left of the machine may be used for the printing of the item numbers, and the remainder of the rows of keys used for printing and adding in the usual manner.

Another object of my invention is to provide means whereby the adding machine may be divided or split into two parts, enabling the operator to print two separate and distinct columns of figures and to separately foot the same. As in the case of the adjustment referred to in the foregoing paragraph, the machine may be split at any point, thus with a machine with nine rows of keys enabling the operator to print and add one column of four and another column of five figures, or one column of six figures and another column of three figures, or any other sub-division of nine, as may be desired.

Another object of my invention is to provide means whereby a single item may be eliminated at will from the adding or, as it is termed, accumulating mechanism, but still be printed in the column of figures on a sheet of paper. In order to distinctly indicate to the operator that a number has been eliminated in the manner described, I have provided means whereby such item when printed will be preceded by a row of ciphers, both the ciphers and the number itself being printed in red or some other color different from that in which the items are ordinarily printed, though it is not essential that both modes of characterizing the eliminated or non-added item be employed.

Another object of my invention is to provide means whereby an item may be put into the machine and added in the usual manner, but without printing the same in the column of figures, and also without feeding the paper forward, thus avoiding a blank space in the column where the omitted number ordinarily would have appeared, though in the matter of adding a number or amount without printing, my invention is not necessarily limited to suspending the paper feed.

In the drawings—Figure 1 is a general view of the mechanism whereby the functions above described are accomplished. Fig. 2 is a detail view of the key for suppressing the printing and paper feeding. Fig. 3 is a transverse sectional elevation, taken near the front of the machine and showing the mechanism whereby the printing of a total of designating numbers or the like is prevented. Fig. 4 shows said mechanism in action. Figs. 5, 6, 7 and 7ª are detail views of the mechanism for splitting the machine into two parts. Figs. 8 and 9 are detail views of the eliminating key and connected mechanism. Fig. 10 is a detail view of the total key, as constructed for use in connection with the other mechanism herein described. Fig. 11 is a detail view of part of the eliminating mechanism.

I will first describe the means for splitting the machine into two parts, for use as a gate machine or as two separate adding machines.

The hammers whereby the type are driven against the paper are represented by the numeral 1. These hammers, of which there is one for each order of digits, are pivoted upon a cross bar 2. The ends of the hammers are notched, as shown at 3. Also pivoted upon the rod 2 are operating arms 4, having lugs 5 adapted to engage the notches 3 in the hammer arms. The arms 4 are drawn downward by springs 5',—shown in Fig. 2 of the drawing—these springs being attached at their lower ends to a fixed part of the frame of the machine and at their upper ends to hooks on the lower sides of the arms 4.

The numeral 6 represents a trigger formed at its upper end with a shoulder 7, adapted to engage a lug 8 on the operating arm 4. The triggers are pivoted upon a transverse rod 10 and are impelled forward by springs 300. The forward arm of each trigger is notched, as shown at 11.

The numeral 12—Fig. 1 of the drawings—represents one of the type carrying bars, the type therein being indicated by the numeral 13. It will be understood that there is a type bar corresponding to each order of digits upon the keyboard of the machine, and that the type bars corresponding to the orders of digits in any number move forward when such number is impressed upon the keyboard and the operating handle actuated after the familiar mode of operation of machines of this class and as shown and described in my said prior patents. Upon each of the type carrying bars 12 is a stud 15 normally seated in the notch 11 in the lower side of the trigger 6. The forward movement of any of the type carrying bars and its attached stud 15 raises the corresponding trigger 6, thus throwing the shoulder 7 thereon beyond the range of movement of the stud 8 on the operating arm 4 and permitting the attached spring 5' to draw said operating arm downwardly. The downward movement of the operating arm 4 is communicated through the stud 5 to the rear end of the hammer arm 1, thus throwing the hammer upward.

The numeral 16 represents the main operating shaft of the machine. The parts are represented in Fig. 2 of the drawing in the position occupied when the machine is at rest. Upon each actuation of the operating handle the shaft 16 rotates in a counter-clockwise direction, thus, through the cranks 17, drawing the links 18 downward, one of the cranks and links being situated at each side of the printing mechanism. Extending between the upper ends of the links 18 is a transverse rod 19 which normally upholds the arms 4 and so retracts all of the hammers. This rod is arranged to travel in curved slots 20 in the side frames 27 of the printing mechanism. The downward movement of the rod 19 incident to the operation of the main operating handle of the machine permits the operating arms 4 to be drawn down by the springs 5'. The downward movement of the operating arms, however, is arrested by the detaining bar 21, shown in Figs. 1 and 2 of the drawings. (See also Figs. 5 and 6.) This detaining bar extends transversely of the machine between the arms 22, which are situated at the sides of the frame of the printing mechanism. The upper ends of the arms 22 are drawn forward by means of springs 23'. At their lower ends the arms 22 are pivoted upon a transverse rod 23. The transverse rod 23 is mounted in the crank arms 24, these crank arms being in turn rigidly secured to a rock shaft 25. By means hereinafter to be described the rock shaft 25 may be partially rotated, thus moving the rod 23 rearwardly from the position shown in Fig. 2. The side frames 27 of the printing mechanism are slotted—as shown at 26—in order to permit the forward and backward movement of the rod 23 referred to.

The arms 22 are formed with cam surfaces 28, adapted, when the shaft 23 is in its forward position, to project beyond the rear edges of the slots 20, as shown in Fig. 2 of the drawings. When the rod 23, however, is moved rearwardly by the rotation of the shaft 25, the cam surfaces 28 lie back of the said edges of the slots 20. In the forward position, that is, when the shaft 23 is in the position shown in Fig. 2, the rod 19 will, upon its downward movement in the slots 20, contact with the cam surfaces 28 and move the arms 22, together with the detent 21, rearwardly. But when the shaft 23 is in its rearward position with the cam surfaces 28 back of the edges of the slots 20, the arm 19 will descend without contacting with said cam surface and without imparting movement to the arms 22 and detent 21.

The normal position of the rod 23 is at the forward end of the slot 26, in which position the cam surfaces 28 lie in the path of movement of the rod 19. The detent 21 normally occupies its forward position by reason of the tension of the springs 23, in which position the detent 21 lies in the path of movement of the rear ends 30 of the operating arms. If the operating handle be moved forward after pressing one of the keys the type carrying bar 12 will move forward, thus causing the stud 15 to lift the forward arm of the trigger 6 and move shoulder 7 backward out of the path of the stud 8 upon the operating arm 4. The movement of the operating handle will also cause a downward movement of the rod 19, which will permit all of the operating arms 4 to fall until the rear ends thereof contact with the detent 21. The further downward movement of the operating rod 19 will, through contact with the cam surfaces 28, move the detent 21 backward out of the path of movement of the rear ends 30 of the operating arms 4. The operating arms 4 will thereupon be drawn downward by the springs 5′ until the lugs 8 thereon contact with the shoulders 7 upon the triggers 6. Those of the operating arms, however, corresponding to the triggers which have been actuated by the movement of the corresponding printing bars will be drawn downward to the full limit of their motion by reason of the fact that the shoulders 7 have been moved back beyond the path of movement of the lugs 8. This extreme downward movement of such of the operating arms 4 as are free to so move will be communicated to the hammers 1, through the lugs 5 upon the operating arms and the notches 3 in the rear ends of the hammers, thus causing these hammers to move upwardly and drive the type against the sheet of paper which underlies the usual roller platen arranged as shown in my said prior patents.

In the normal positions of the type carrying bar 12 the forward type thereon, which is a cipher, lies in the path of movement of the corresponding printing hammer. It is desirable in machines of this type to provide means whereby a number consisting of one or more digits followed by a number of ciphers can be printed without the necessity of pressing keys for the ciphers. In order to accomplish this result, the trigger arms 6 are formed with laterally extending lugs 40, one such trigger arm being shown in Fig. 7 of the drawings. The other trigger 6, shown in that view, is provided with a movable lug 40′, for a purpose hereinafter to be described. The lug 40 upon each trigger extends to the right—looking at the machine from the front—sufficiently to overlap the next trigger. When the upper arm of any trigger 6 therefore moves backward, it will carry with it the next trigger to the right, which trigger, being also provided with a lug 40, will communicate its movement to the adjoining trigger. By this means it will be apparent that the forward movement of any of the type carrying bars 12 will throw all of the triggers to the right to release position, even though the printing bars corresponding to those triggers remain stationary, owing to the fact that the numerical keys corresponding thereto have not been actuated.

For the purpose of subdividing or splitting the printing mechanism by suspending the coöperative tripping of triggers, I provide the movable lug 40′ above mentioned, the same being part of an arm 60 pivoted to the trigger 6. The next trigger to the right of the one provided with the lug 40′ is formed with a notch 6′. When in normal position for operation, as an ordinary adding machine, the lug 40′ occupies such a position (enforced by a spring 90 which connects the rear end of the arm 60 to the trigger) that when the upward arm of the trigger 6, which carries it, moves backward the lug 40′ contacts with the edge of the adjoining trigger just above the notch 6′. Means hereinafter to be described are provided whereby, when it is desired to split the machine into two parts, the arm 60 and with it the lug 40′ may be moved downward upon the pivot 63 to such a position that upon the backward movement of the upper arm of the trigger the lug 40′ enters the notch 6′ of the adjoining trigger and, therefore, does not communicate any movement to such adjoining trigger. By this means it will be apparent that upon the depression of one of the keys to the left of the notched trigger zeros will be printed to the right of the number corresponding to said key only up to and including the trigger which is provided with the movable lug 40′. The movable lug 40′ may be mounted upon any one of the triggers 6, thus rendering it possible to divide the machine at any point. The means whereby the movable arm 60 is actuated will now be described.

The total key is shown in detail in Fig. 10 of the drawings. Connected to the key proper 65 is a depending stem 66, adapted to be received in the tubular stem 67 projecting upwardly from the bell crank lever 68. Also projecting downwardly from a lateral extension 69 of the key 65 is a second depending stem 70, adapted upon rotation of the total key to be received in any one of three openings, 71, 72 and 73, in the upper side of the machine casing, the openings 71 and 73 being shown in Fig. 1 and the opening 72 being shown in Fig. 3. (See also Fig. 7ᵃ.) The key 65 is normally held down against the top of the tube 67 by means of a spring 74 attached at its lower end to the tube 67 and at its upper end to a hook 75 on the lower end of the stem 66.

Referring now to Figs. 6 and 7 of the drawings, the numeral 6 designates the trigger which carries the movable arm 60 with its attached lug 40′. The notch in the adjoining trigger to the right is indicated by the dotted line 6′. Bearing upon the forward extension of the pivoted arm 60 is a stud 80 carried by a crank arm 81 rigidly mounted upon rock shaft 82, to which rock shaft is also rigidly secured a second crank arm 83. The crank arm 83 is connected by means of a link 84 with one arm 85 of a bell crank lever, the other arm 86 of which lies below the stem 70 of the total key. The arm 60 is held in elevated position in contact with the stud 80, by means of the spring 90 attached to the rear end of arm 60 and to the main body of the trigger 6. The machine is adjusted for use as an ordinary adding machine by rotating the total key 65 to the position shown in Fig. 5 of the drawings, in which position the stem 70 rests upon the bell crank arm 86, thus depressing said arm sufficiently to hold said arm 83 in the rearward position illustrated. The spring 92 attached at one end of the arm 83 and at the other end to a fixed part 94 of the machine frame tends to move the arm 86 upward but the spring 74 dominates it. The depression of the arm 86 to the position shown in Fig. 5 raises the stud 80 upon the arm 81 sufficiently to permit the arm 60 to rise to its upper position under the tension of the spring 90, in which position the lug 40' thereon will, when the trigger is moved backward, contact with the adjoining trigger 6 to the right and move it also backward. In this position of the parts, therefore, the machine will operate in the ordinary manner, each trigger of the set communicating its movement to the trigger at the right.

When it is desired to split the machine the total key is raised against the tension of the spring 74 sufficiently to lift the stem 70 out of the hole 71. The total key is then rotated a quarter of a revolution and the stem 70 permitted to descend into the hole 72. The removal of the stem 70 from above the arm 86 permits the spring 92 to rotate the rock shaft 82, thereby depressing the stud 80 upon the link 81, and carrying the pivoted arm 60 with its stud 40' downward to a point where, upon the backward movement of the trigger 6, the stud 40' enters the notch 6' of the adjoining trigger to the right. Under these circumstances no movement is communicated to said adjoining trigger, and hence the part of the machine to the left of and including the trigger upon which the pivoted arm 60 is mounted is independent so far as the printing mechanism is concerned. The mechanism so far described, however, in no way affects the actuation of the accumulating wheels.

The accumulating mechanism comprises wheels 180 actuated by racks 150 upon the slides 95, which slides are impelled forward by springs upon being released by the actuation of the main handle of the machine after the manner of the similar slides of my prior patents. In order, when a total is taken, to prevent the accumulating mechanism from being actuated by the mechanism to the left of and including the trigger 6, which is provided with the pivoted arm 60, I have provided means for preventing the rack slides 95, corresponding to this part of the machine, from moving when the total key is depressed and the main handle of the machine is actuated. The following is a description of the mechanism whereby this function is accomplished.

When the total key 65 is turned to the position shown in Fig. 3 with its depending stem 70 in the hole 72 the depression of the total key 65 is communicated through said stem 70 to the stem 100, which projects upwardly from the arm of a bell crank lever 101. The bell crank lever 101 is pivoted to a fixed part of the machine at 102, and its vertical arm engages a recess 103 in a transversely shiftable upright plate 104 provided with a series of notches 105 which normally register with the rack slides 95, as shown in Fig. 3 of the drawing. The depression of the total key 65, however, when in the position shown in Fig. 3 causes the bell crank 101 to move upon its pivot 102 and throw the plate 104 to the position shown in Fig. 4, in which position the notches 105 are out of register with the slides 95 and the movement of the latter is prevented by the plate 104.

From the foregoing it will be apparent that when the total key is in the position shown in Fig. 3, two independent columns of figures may be printed upon the sheet of paper in the adding machine, and that upon taking a total in the usual manner by depressing the total key and actuating the operating handle the accumulating mechanism will be affected and the printing mechanism actuated only by the rack bars 95 at the right-hand of the split. The operation of the machine when so adjusted, therefore, is to print two independent columns of figures, but upon operation of the total key to print the total of only the right-hand column. This adjustment of the machine is useful in those cases where it is desired to assign a number, such as a date or page number, to each of the items placed in the column to be added.

The second variation from the ordinary action of the adding machine is accomplished by rotating the total key 65 until its stem 70 registers with the hole 73 in the casing. In this position the stem 70 does not contact with any of the operating parts of the machine, and the key is moved to this position merely for the purpose of rendering that stem inoperative. When so adjusted, the machine is split into two independent adding machines, each printing and adding a column and printing a total thereof independent of the other. The means whereby this is accomplished has already been described. The mere removal of the stem 70 from its position over the arm 86 of the bell crank, which is located beneath the hole 71, permits said arm 86 to rise in the manner above described, thus lowering the lug 40' to a position where it enters the notch 6' of the next trigger to the right, thus preventing the carrying of ciphers by the trigger 6, to which the pivoted arm 60 is attached. The plate 104 occupies its normal position—shown in Fig. 3—at all times under the impetus of the spring 110, except when the total key 65 is depressed with its stem 70 in the hole 72. Therefore, it will be seen that when the stem 70 is in register with the hole 73 the machine will be split by reason of the position of the lug 40', and the left hand section of rack slides 95 will be free to act in a totaling operation, by reason of the fact that the notches in the plate 104 are in register with said rack slides.

I shall now describe the mechanism whereby items may be printed in a column without affecting the accumulating mechanism and without being included in the total of such column.

As will be well-known to those familiar with machines of the type to which this invention is applied, the accumulating mechanism is actuated by racks 150 pivotally mounted, as at 151, upon slides 95. The racks 150 are at the proper times thrown into and out of engagement with the gear wheels 180, which form a part of the accumulating mechanism. The remainder of the accumulating mechanism comprising carrying means is not shown or described in this application, for the reason that it forms no part of my present invention, and an understanding of its specific structure is not necessary to a comprehension of the invention herein claimed. The racks 150 are elevated and depressed as above described—by the engagement of the slot 155 in the pivoted cam arm 156, with a rod running through slots in the racks. The left-hand or rear end of the slot 155 is farther from the pivotal center of the arm 156 than the other end. When the cam arm 156, therefore, is in the position shown in Fig. 1 of the drawings, the rack 150 occupies its lower position, and may be elevated by moving the arm 156 forwardly upon its pivot. The forward movement of the arm 156 is brought about by the movement of the link 157, which engages a stud 158 upon said arm. The link 157 is pivoted to link 400 mounted upon rock arms 158' and 159, said rock arms being mounted at their lower ends upon pivots 160 and 161. Movement is imparted to the link 157 by the rock arm 163, which is rigidly mounted upon the operating shaft 16. At the backward limit of its movement the stud 170 upon the rock arm 163 contacts with the arm 159 and forces the link 157 backward, and at the forward limit of its movement the stud 170 contacts with the arm 158' and forces the link forward. It will be understood that the arm 163 moves forward when the operating handle of the machine is pulled forward and moves backward with the operating handle of the machine. In adding machines of this type, as ordinarily constructed, the link 157 has been permanently pivoted to the arm 156, and is, therefore, always in engagement with said arm. In the structure herein illustrated, however, the stud 158 upon the arm 156 is received in a notch 173 in the upper edge of the link 157, and said link 157 is continued forwardly of the arm 156 to a point beneath the elimination key 175 (Figs. 1 and 8). A stud 176 upon the lower end of the stem of the elimination key engages a slot 177 in the forward end of the link 157. Depression of the elimination key 175, therefore, has the effect of lowering the link 157, which is pivotally attached to the upper end of the arm 158', to such an extent that the slot 173 therein no longer engages the stud 158 upon the arm 156. When the parts are in this position, therefore, the forward and backward movements of the link 157 will not be communicated to the arm 156, which, therefore, will remain in its normal backward position,—shown in Fig. 1 of the drawings—in which position the racks 150 are disengaged from the spur gears 180 of the accumulating mechanism. This adjustment of the parts, therefore, results in enabling the operator to print a number in the column of figures by depressing the proper keys and actuating the operating handle of the machine, but for the reasons above stated, the actuation of the operating handle will have no effect upon the accumulating mechanism, by reason of the fact that owing to the depression of the elimination key 175 the racks do not at any time engage the spur wheels 180 of the accumulator. The lower end of the stem 181 of the elimination key is formed with a notch 184. The stem is connected to a fixed part of the machine by a spring 185, which imparts an upward and backward impulse to said stem. When the key is depressed the notch 184 is caused to engage with a fixed part 187 of the machine by the backward pull of the spring 185, thus causing the key to remain depressed without the necessity of holding it down manually. When the operating handle is pulled the forward movement of the link 157 causes the notch 184 to become disengaged from the projection 187, thereby permitting the elimination key to rise after the operating handle has been actuated and the link 157 has returned to its rearmost position, where the notch 173 is in register with the lug 158 on the cam arm 156. In order to limit the movement of the link 157 when the notch 173 is out of engagement with the stud 158, said link is provided with lugs 190, one at the notch and the other spaced therefrom (Fig. 8).

It is desirable that when the eliminating key is operated in the manner above described some means be provided upon the printed list for indicating the fact that the eliminated number has not been entered in the accumulator and does not form a part of the total of the column of figures. In order to accomplish this function, a lever 200 is pivotally mounted upon the stud 158 of the arm 156. The lever 200 lies at the side of and adjacent to the link 157, and at its forward end is provided with two studs 201, which engage the upper and lower edges, respectively, of said link, 157. By this means the lever 200 is caused to partake of the upward and downward movement of the link 157 which is imparted to it by the eliminating key. When the eliminating key, therefore, is depressed, the rear end of the lever 200 will rise. A stud 202 carried by the rear end of the lever 200 then acts upon a cam edge of an arm 203 depending from a rock shaft 204 to swing said arm rearward. A forked arm 205 is rigidly secured to the shaft 204, and a stud 206 projecting from the forward extension of the first trigger 6 at the left of the machine is embraced by the prongs of the forked end of said arm 205. It will thus be apparent that when the eliminating key 175 is depressed, an upward movement will be imparted to the arm 205, thus raising the forward arm of the left-hand trigger 6, and the shoulder 7 thereon will be thrown from beneath the lug 8 on the trigger arm 4, shown in Figs. 5 and 6 of the drawing. This operation will have the effect of releasing the first printing hammer, and the movement of the first trigger 6 will be communicated by means of the lug 40 to the succeeding triggers. By this means each of the numbers eliminated from the accumulating mechanism will, when said number is printed upon the sheet of paper in the machine, be preceded by a row of ciphers extending from the left-hand margin of the column to the first digit representing the amount so eliminated, unless, of course, the number runs to the full denominational capacity of the machine, which would rarely, if ever, happen.

As an additional means of indicating that the eliminated numbers do not form a part of the total, I have provided means whereby such numbers are printed in red or some other color different from that in which the numbers are ordinarily printed. The ribbon spool is represented by the numeral 220 carrying a ribbon divided longitudinally into parts of two colors, as indicated. The ribbon spool is mounted in a frame capable of a forward and backward movement. Connected to this frame is a link 221 attached at its forward end to the arm 222, which is rigidly secured to the rock shaft 223. Projecting rearwardly from said rock shaft is a rigid arm 224, depending from which is a link 225 upon which near its lower end is a stud 226. A second stud 227' near the lower end of the depending arm 225 is adapted to co-act with a cam surface 228' upon the rear end of the arm 200, as illustrated in Figs. 1 and 11 of the drawings. The stud 226 is adapted to co-act with the forked end of arm 227. The arm 227 is mounted upon a triangular skeleton plate 228; and a reciprocating movement is imparted to said plate 228 by the engagement of a stud 229 thereon with a slotted cam 230 mounted upon the operating shaft 16. The depending arm 225 is normally held toward the front of the machine by spring 230. When in this position, the stud 226 thereon lies forwardly of the lower prong of the forked end of the arm 227, as shown in Fig. 1 of the drawings. In this position, therefore, the reciprocating movement of the arm 227 is not communicated to the depending arm 225. Upon the depression of the elimination key, however, the action of the cam surface 228' of the arm 200 is communicated to the stud 227' and throws the depending arm 225 backward to the position shown in Fig. 11, thereby throwing the stud 226 above the lower prong of the forked member 227. Under such circumstances, when the operating handle is pulled forward, and the arm 227 rises, the depending arm 225 is lifted, thus rotating the rock shaft 223, which has the effect of moving the ribbon frame forward and bringing the rear and different colored part of the ribbon in register with the printing hammers and type. The eliminated item will by this means be printed in a color different from the other numbers in the column.

In order to prevent depression of the total key when the eliminating key is depressed and vice versa, the total key link 701 is provided with a short flange or shelf 702 (Fig. 9) and the elimination key has a leg 700 which when said key is depressed will obstruct the link 701 and which leg will be obstructed by the flange or shelf 702 of the link when the latter has been thrust rearward by depression of the total key. Said link is coupled at its forward end to the bell-crank lever 68 and at its rear end to a forked thrust bar 701ª, one of whose branches carries a pin normally restraining a dog or pawl 163ª. The latter is pivoted upon the arm 163 to which it is further connected by a centralizing spring 163ᵇ, and the arm or link 159 has a forwardly extending branch 159ª serrated in its upper edge for the engagement of said dog or pawl when the total key is depressed. The effect is to engage the racks 150 with the accumulator wheels 180 at the outset of the operation, by reason of the said pawl or dog rocking the arm or link 159 and thereby moving the link 157 forward. The other rock arm or link 158' has a notched branch 158ª with which the dog or pawl 163ª engages, (if the total key is held down throughout the operation,) to disengage the racks 150 from the wheels 180.

The above described mechanism for controlling engagement and disengagement of wheels and racks is fully described and illustrated in my Patent No. 995,569, issued June 20th, 1911, and hence needs no further elaboration in the present specification.

The last feature of my invention consists in means for causing a number registered upon the keyboard of the machine to be entered in the accumulating mechanism without being printed upon the sheet of paper in the machine and without spacing the paper. The mechanism for accomplishing this end is illustrated in Fig. 1 of the drawings and in detail in Fig. 2. As above described, the rod 23 upon which the arms 22 carrying the detent 21 is pivoted is mounted upon arms 24 attached to the rock shaft 25. When said arms 24 and rod 23 are in their forward and normal position— as illustrated in Figs. 1 and 2 of the drawings—the cam surfaces 28 lie in the path of movement of the reciprocating rod 19, whereby when such rod is depressed the arms 22 will be moved backward to an extent sufficient to carry the detent 21 out from beneath the rear ends of the operating plates 4. This is the normal operation of the machine. When it is desired, however, to prevent a number from being printed the key 175ª is moved to its rearmost position, in which position it is held by engagement of the notch in the stem thereof with the lower edge of the opening in the frame of the machine through which it passes. The key 175ª is impelled forward and downward by the spring 177ª. A rod constituting a continuation of the stem of the key 175 is coupled to an arm 178 secured to the rock shaft 25 so that thrusting inward of the key oscillates said shaft. The movement of the rock shaft 25 carries the rod 23 back to the rear of the slot 26, thereby moving the cam surfaces 28 on the arms 22 out of the path of movement of the rod 19. It will be seen that under these circumstances the rod 19 will not, in its downward movement, contact with or impart any movement to the arms 22 and the detent 21 carried thereby. During the actuation of the operating handle, therefore, all of the hammers will be restrained from action by reason of the fact that the detent 21 will hold the operating arms 4 against movement.

The paper feeding mechanism is rendered inactive by the depression of the key 175 through the instrumentality of an arm 725, rigidly secured to the rock shaft 25 and at its forward end carrying an upwardly projecting pivoted stop bar 726 suitably guided with its upper end adjacent the cross rod 729 of the familiar line spacing bail, the numeral 728 designating one side arm of such bail. Movement is imparted to the rod 729 by the arms 730 and 731, which project upwardly from and are secured to the element 732, which reciprocates with each actuation of the operating handle of the machine. The arm 730 is rigidly attached to the part 732, but the arm 731 is pivoted to said part 732 and is yieldingly held by the spring 735 in the position illustrated. The forward movement of the part 732 impels the upper ends of the arms 730 and 731 backward, by reason of their being on the opposite side of the pivot 740 of the arm 732. Normally the backward movement of the arm 731 is communicated to the rod 729 and to the paper feeding pawl. But upon the depression of the key 175 and the consequent rotation of the rock shaft 25, the stop bar 726 is raised into the path of movement of the rod 729, thereby preventing the actuation of the paper feeding bail, the arm 731 turning on its pivot against the tension of the spring 735.

For convenience of reference, I have in the following claims used the term of "totaling split" to designate generally the provision of any means for preventing the taking or printing of the total of the numbers resulting from the depressions of keys in a predetermined part of the keyboard. I have also used the term "split printing device" as a general designation for any means of separating the printing mechanism into independent parts for the purpose of rendering it possible to print separate columns of figures.

What I claim is:

1. In a device of the class described, printing mechanisms for each of a plurality of denominations, triggers for restraining the action of said printing mechanisms, projections upon said triggers adapted when said triggers are actuated to contact with and actuate the adjoining triggers, one of said projections being movable and the adjoining trigger being notched, and means whereby said movable projection may be so positioned that upon the actuation of the trigger upon which said movable projection is mounted it will enter the notch in the adjoining trigger without transmitting movement to the latter.

2. In a device of the class described, an accumulator, a key movable to a plurality of positions, printing mechanisms for each of a plurality of denominations, operative connections between said printing mechanisms, a splitting device whereby one of said operative connections may be broken, and a member whereby the action of part of the accumulator may be prevented, said key being operatively connected to said splitting device and said member in such manner that its adjustment to one position renders the splitting device inoperative, and its depression in another position renders said member operative to prevent the actuation of the accumulator.

3. In a device of the class described, an accumulator, a key movable to a plurality of positions, printing mechanisms for each of a plurality of denominations, operative connections between said printing mechanisms, a splitting device whereby one of said operative connections may be broken, and a member whereby the action of part of the accumulator may be prevented, said key being operatively connected to said splitting device and said member in such manner that its adjustment to one position renders the splitting device inoperative, and its depression in another position renders said member operative to prevent the actuation of the accumulator and its adjustment to a third position renders both said splitting device and said member inoperative.

4. In a device of the class described, a key adjustable to a plurality of positions, printing mechanism, a splitting device therefor, accumulating mechanism, and a splitting device therefor, said key being provided with connections whereby when adjusted to one position both of said splitting devices are inoperative, when adjusted to a second position both of said splitting devices are operative, and when adjusted to a third position the printing split is operating and the accumulating split inoperative.

5. In an adding machine, a key having a depending stem pivotally and yieldingly supported, an eccentric pin depending from said key, split printing mechanism comprising a part over which said eccentric pin depends when said key is in normal position, split accumulating mechanism adapted to be actuated by said eccentric pin when said key is rotated to another position and depressed, and means whereby the rotation of said key throws it out of operative relation with the split printing and split accumulating mechanism.

6. In a machine of the class described, printing mechanism, an accumulator, means for disabling the latter while printing, and means whereby a number will be printed in a distinctive color as an incident to such disabling of the accumulator.

7. In a machine of the class described, printing mechanism, an accumulator, means for disabling the latter while printing, means whereby a number will be printed in a distinctive color, and means whereby it will be preceded by ciphers.

8. In a machine of the class described, an accumulator comprising spur wheels, reciprocating racks, a cam for moving said racks into mesh with said spur wheels, a reciprocating element adapted to actuate said cam, and an eliminating key whereby said reciprocating element can be thrown out of engagement with said cam.

9. In a machine of the class described, an accumulator, printing mechanism comprising a multi-colored ribbon, and an eliminating key having connections whereby the actuation of the accumulator is prevented and the ribbon is shifted.

10. In a machine of the class described, an eliminating key, printing mechanism comprising a movable ribbon frame, an actuating element operatively connected to said ribbon frame, a reciprocating element, and means controlled by said eliminating key for moving said actuating element into the path of movement of said reciprocating element.

11. In a machine of the class described, an accumulator comprising spur wheels, reciprocating bars, racks pivoted to said bars, a cam adapted to move said racks into mesh with said spur wheels, a reciprocating member having a part normally engaging said cam, and an eliminating key provided with connections whereby the reciprocating member can be thrown out of engagement with said cam.

12. In a machine of the class described, an accumulator, actuating means therefor, an eliminating key, a ribbon carrying frame, and means actuated by the depression of the eliminating key, whereby the ribbon is shifted transversely and the actuation of the accumulator is prevented.

13. In a machine of the class described, printing mechanism, actuating means therefor, a ribbon frame, an accumulator, an elimination key, and means controlled by said elimination key for actuating the printing mechanism, for preventing the actuation of the accumulator and for shifting the ribbon frame.

14. In a machine of the class described, printing mechanism, actuating means therefor, an accumulator, and means controlled by the elimination key for preventing the actuation of the accumulator and for printing ciphers to the left of numbers printed when the accumulator is prevented from acting.

15. In a machine of the class described, printing mechanisms for each of a plurality of denominations, triggers for restraining the action of said printing mechanism, an accumulator, actuating means therefor, an elimination key, and means controlled thereby for preventing the actuation of the accumulator when a number is printed and for releasing the triggers of the printing mechanism of the denominations to the left of the number printed.

16. In a machine of the class described, printing mechanism, a detent for restraining the action of said printing mechanism, a cam operatively connected to said detent, a reciprocating element normally contacting with said cam, and means for moving said cam beyond the path of movement of said reciprocating element.

17. In a machine of the class described, printing mechanism, a detent for restraining the action thereof, a cam operatively connected to said detent, paper feeding mechanism, a reciprocating element normally contacting with said cam, and means operative to move said cam beyond the path of movement of said reciprocating element and to prevent the actuation of the paper feeding mechanism.

18. In a machine of the class described, printing mechanism, an accumulator, means for splitting the printing mechanism whereby part of said printing mechanism can be operated independently of the remainder thereof, and means whereby the accumulator and printing mechanism can be operated each independently of the other both when the printing mechanism is split and when it is acting as an entirety.

19. In a machine of the class described, accumulating mechanism, printing mechanism, means for simultaneously operating both of said mechanisms and means for interrupting the operation of the accumulating mechanism, in combination with means for, automatically and as an incident of said interruption causing items printed during said interruption to be recorded in an ink of a different color from that in which items accumulated in the machine are recorded.

20. In a machine of the class described, accumulating mechanism, printing mechanism, means for simultaneously operating both of said mechanisms and means for interrupting the operation of the accumulating mechanism, in combination with means for, automatically and as an incident of said interruption, causing items printed during said interruption to be recorded in an ink of a different color from that in which items are recorded at other times.

21. In a calculating machine, an adding mechanism, an associated printing mechanism adapted for printing figures in columns and for printing the total of said figures, devices for conjointly operating the two said mechanisms, an inking means for the printing mechanism, and means for simultaneously shifting the inking means and holding the adding mechanism inactive while the printing mechanism is in operation.

22. In a machine of the character described, the combination of a prime mover, adding wheels, actuators therefor, type carriers moving with the latter, hammers for impressing the type, detents restraining the hammers and controlled by the type carriers and by the prime mover, and a detent-controlling key and connections for preventing at will printing of an amount which is being added on said wheels.

23. In a machine of the character described, the combination of a prime mover, adding wheels, actuators therefor, type carriers moving with the latter, hammers for impressing the type, detents restraining the hammers and controlled by the type carriers, a detent common to the hammers and controlled by the prime mover, and a key and connections for preventing release of the hammers from restraint by one such detent means, though released from restraint by the other.

24. In a machine of the character described, the combination of adding wheels and actuators relatively movable for engagement and disengagement, manipulative amount determining means, type carriers, hammers for impressing the type, hammer detents, a key and connections for preventing engagement between wheels and actuators and directly effecting hammer detent displacement to produce special printing denoting an unadded number.

25. In a machine of the character described, the combination of adding wheels and actuators relatively movable for engagement and disengagement, manipulative amount determining means, type carriers, hammers for impressing the type, hammer detents, a depressible key, connections therewith for preventing engagement between wheels and actuators, and connections from said key to a hammer detent for displacing the latter by depression of the key whereby to produce special printing to denote an unadded number.

26. In a machine of the character described, the combination of adding wheels and actuators relatively movable for engagement and disengagement, manipulative amount determining means, type carriers, hammers for impressing the type, a pivoted spring-held hammer detent, a depressible key, connections therewith for preventing engagement between wheels and actuators, and connections from said key to said pivoted detent for displacing the latter by depression of said key whereby to produce special printing to denote an unadded number.

27. In a machine of the character described, the combination of adding wheels and actuators relatively movable for engagement and disengagement, manipulative amount determining means, type carriers, hammers for impressing the type, a pivoted spring-held hammer detent, a depressible key, connections therewith for preventing engagement between wheels and actuators and a bell crank lever engaged by the key and connected to the hammer detent.

28. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; means operable to prevent movement of certain of the actuators; and a key applied to said controlling connections and adjustable to act also upon said preventing means.

29. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; printing mechanism controlled by the wheels and actuators; means operable to prevent operation of part of the printing mechanism; and a key applied to said controlling connections and adjustable to act also upon said preventing means.

30. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; a plate movable to obstruct certain of said actuators; and a key applied to said controlling connections and adjustable to act also upon said plate.

31. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; type carriers set by the said actuators; impression hammers; detents therefor controlled individually by the type carriers and coöperatively related with provisions for suspension of the coöperative relationship at a certain point; and a key applied to said controlling connections and adjustable to control the coöperative relationship of hammer detents.

32. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; type carriers set by the said actuators; impression hammers; detents therefor controlled individually by the type carriers and coöperatively related with provisions for suspension of the coöperative relationship at a certain point; means operable to prevent hammer detent tripping to one side of said point; and a key applied to the aforesaid controlling connections and adjustable to control coöperative action of hammer detents and to act also upon the said preventing means.

33. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; type carriers set by the said actuators; impression hammers; detents therefor controlled individually by the type carriers and having overlapping parts, those of two certain detents being relatively adjustable to co-act or not; and a key applied to the aforesaid controlling connections and adjustable to control relationship between parts of said two certain hammer detents.

34. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; means operable to prevent movement of certain of the actuators; and a key applied to said controlling connections and rotatable to bring it into operative relation to said preventing means.

35. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; a plate movable to obstruct certain of said actuators; operating connections for said plate, and a key applied to the aforesaid controlling connections and rotatable to bring it into operative relation to the said plate operating connections.

36. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; type carriers set by the said actuators; impression hammers; detents therefor controlled individually by the type carriers and coöperatively related with provisions for suspension of the coöperative relationship at a certain point; means operable to prevent hammer detent tripping to one side of said point; and a key applied to the aforesaid controlling connections and rotatable between two positions for causing or preventing coöperative action of hammer detents and rotatable to a position for acting upon the aforesaid preventing means.

37. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; type carriers set by the said actuators; impression hammers; detents therefor controlled individually by the type carriers and having overlapping parts, those of two certain detents being relatively adjustable to co-act or not; operating connections for such parts; and a key applied to said controlling connections and rotatable to and from a position where it acts upon said operating connections.

38. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; type carriers set by the said actuators; impression hammers; detents therefor controlled individually by the type carriers and coöperatively related with provisions for suspension of the coöperative relationship at a certain point; means operable to prevent hammer detent tripping to one side of said point; and a key applied to the aforesaid controlling connections and rotatable between three different positions, in one of which it preserves coöperative relationship of hammer detents at said certain point, in another of which it suspends such relationship and co-acts with the aforesaid preventing means, and in a third of which positions it suspends the said coöperative. relationship while disengaged from the preventing means.

39. In a machine of the character described, the combination of adding wheels; reciprocating actuators therefor; means for keeping the wheels and actuators engaged during movements of the latter in one direction and disengaged during their movement in the other direction; controlling connections for reversing such order of engagement and disengagement; a plate movable to obstruct certain of said actuators; operating connections for said plate, type carriers set by the wheel actuators; hammers; hammer detents individually controlled by the type carriers and having overlapping parts to secure coöperative tripping, one such part being movably mounted on its detent; connections tending to move that part out of position to act on the adjacent detent; and a key applied to the aforesaid controlling connections and rotatable from a position where it engages and restrains the connections to said movable part to a position where it engages the connections for operating the aforesaid obstructing plate.

40. In a machine of the character described, the combination of a prime mover, adding wheels, actuators therefor, type carriers moving with the latter, hammers for impressing the type, detents restraining the hammers and controlled by the type carriers and by the prime mover, a detent controlling key and connections for preventing at will printing of an amount which is being added on said wheels, line spacing mechanism, and means for disabling the same by said key.

41. In a machine of the character described, the combination of an oscillatory prime mover, a line-spacing rod, a pair of jaws embracing the same one positively and the other yieldingly connected to the prime mover; and means for obstructing the yieldingly connected jaw.

42. In a machine of the character described, the combination of an oscillatory prime mover, a line-spacing rod, a pair of jaws embracing the same one positively and the other yieldingly connected to the prime mover; and a key and connections for obstructing the yieldingly connected jaw.

43. In a machine of the character described, the combination of an oscillatory prime mover, a line-spacing rod, an operating lever; a jaw rigidly connected thereto and engaging said rod; a jaw pivoted on said lever and spring connected to the other jaw and engaging the opposite side of the rod to that engaged by the first jaw; and means for obstructing the pivoted jaw.

44. In a machine of the character described, the combination of a prime mover, adding wheels, actuators therefor, type carriers moving with the latter, hammers for impressing the type, detents restraining the hammers and controlled by the type carriers and by the prime mover, a line-spacing rod, a pair of jaws engaging the same one positively and the other yieldingly connected to the prime mover; and a detent-controlling key and connections for preventing at will printing of an amount which is being added on said wheels, said key and connections also obstructing the aforesaid yieldingly connected line-spacing jaw.

FRANK C. RINSCHE.

Witnesses:
T. A. MYERS,
J. R. VALLENTINE.

---

It is hereby certified that in Letters Patent No. 1,050,041, granted January 7, 1913, upon the application of Frank C. Rinsche, of St. Louis, Missouri, for an improvement in "Calculating-Machines," errors appear in the printed specification requiring correction as follows: Page 8, lines 43-44, for the word "operating" read *operative;* same page, lines 111-112 and 119-120, strike out the words "actuating means therefor"; and same page, lines 112 and 120, after the word "accumulator" insert the words *actuating means therefor;* and that the said Letters Patent should be read with these corrections therein that the same may conform to the record of the case in the Patent Office.

Signed and sealed this 8th day of July, A. D., 1913.

[SEAL.]

C. C. BILLINGS,

*Acting Commissioner of Patents.*